Patented June 16, 1925.

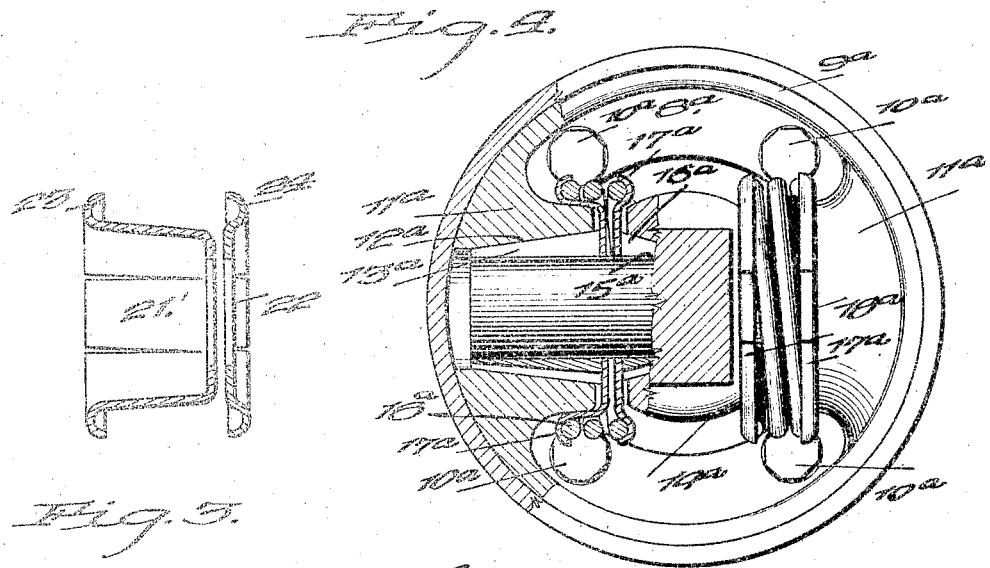
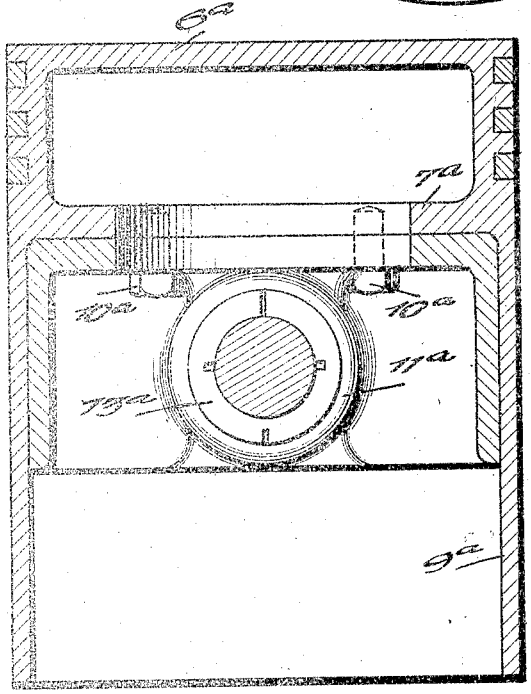

1,542,209

UNITED STATES PATENT OFFICE.

ALFRED BERGERON, OF NEW BEDFORD, MASSACHUSETTS.

WRIST-PIN MOUNTING.

Application filed July 28, 1922. Serial No. 577,648.

*To all whom it may concern:*

Be it known that I, ALFRED BERGERON, a citizen of the United States, residing at New Bedford, in the county of Bristol and State of Massachusetts, have invented certain new and useful Improvements in Wrist-Pin Mountings, of which the following is a specification.

The present invention relates particularly to means for mounting the wrist pin that connects the pitman with the piston of an internal combustion engine, though obviously not limited to this specific structure.

The object is to provide novel and effective means whereby wear in the bearings will be automatically compensated and the wrist pin will be free or "floating", so that the said wear will be more generally distributed and thus lessened.

In the accompanying drawings:—

Figure 1:
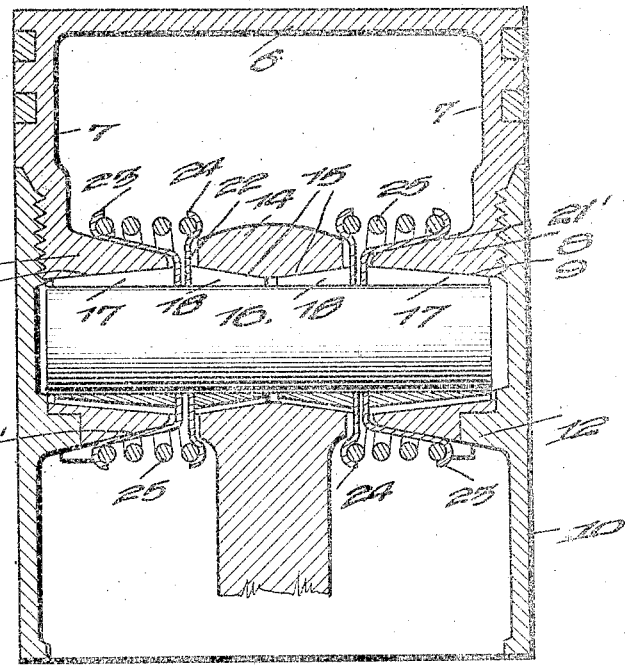
Figure 2:
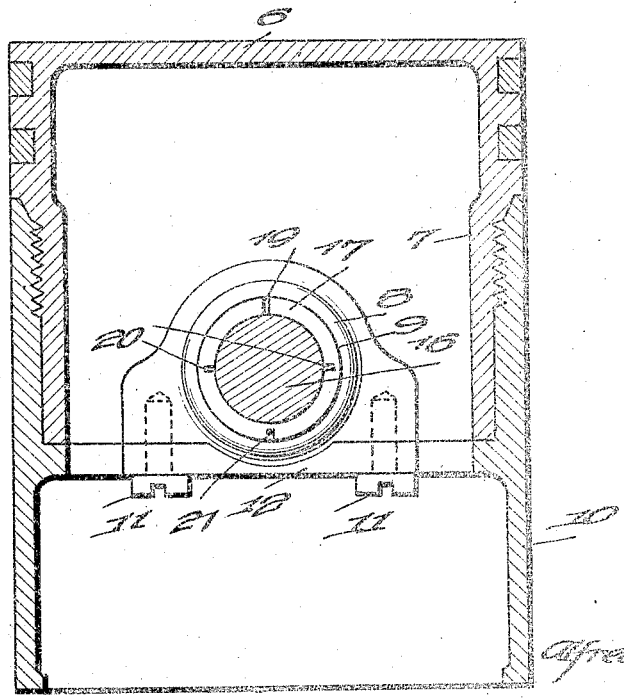

Figure 1 is a vertical sectional view through a piston and wrist pin connection, showing the preferred embodiment of the invention, Figure 2 is a sectional view at right angles to Figure 1, Figure 3 is a detail sectional view through the spring bearing cups or washers, Figure 4 is a plan view partially in section of a modification, Figure 5 is a vertical sectional view of the structure shown in Figure 4.

In the preferred embodiment the piston consists of two sections, a head 6 having side portions 7 provided with opposite internal enlargements 8. These enlargments 8 are provided with openings 9 that taper from their inner to their outer ends. A skirt section 10 is threaded onto the head section 6 and covers the outer ends of the openings 9. This skirt section is held against accidental unthreading by set screws 11 engaging an internal flange 12 of the skirt section and threaded into the enlargements 8 on opposite sides of the openings 9.

A pitman or connecting rod 13 has a terminal portion 14 between the enlargements 8, and has a transverse opening, the end portions of which are inwardly tapered, as shown at 15, this opening being alined with the openings 9 in the enlargements 8. A wrist pin 16, passing through the opening in the connecting rod 13, has its end portions located in the openings 9.

Tapered compressible bushings 17 surround the ends of the wrist pin 16 and are seated in the openings 9. Oppositely arranged bushings 18 are located in the tapered portions 15 of the connecting rod opening and surround the wrist pin 16. These bushings, as shown in Figure 2, are each preferably split, as illustrated at 19, and have internal weakening slots 20. They also are preferably provided with an external weakening slot 21, these various slots being longitudinally disposed, and also constituting oil grooves for the bearing surfaces within and without the bushings. Arranged against the larger exposed ends of said bushings are washers 21' and 22 terminating in grooved or cupped flanges 23 and 24. Coiled springs 25 are interposed between said washers and have their end coils seated in the cups 23 and 24.

It will be clear that with this construction the bushings are urged inwardly into their respective sockets by the interposed springs 25, and therefore any wear which occurs will be taken up by the inward movement of said bushings. It will also be clear that inasmuch as the wrist pin is free and the bushings can rotate, wear will be distributed over a relatively great amount of surface and consequently will be reduced to a minimum.

In the modified form of construction illustrated in Figures 4 and 5, the head is designated $6^a$, and is provided with an internal flange $7^a$, against which is placed the flange $8^a$ of a removable internal skirt ring $9^a$. This ring is held in place by screws $10^a$ passing through the flange $8^a$ and threaded into the flange $7^a$. The ring $9^a$ is provided with enlargements $11^a$ having tapered openings $12^a$, and in these openings are fitted compressible bushings $13^a$.

The connecting rod is designated $14^a$, and has inwardly tapered sockets $15^a$ in which are placed compressible tapered bushings $16^a$. Cupped washers $17^a$ bear against the larger exposed ends of the bushings $16^a$, and interposed therebetween are springs $18^a$. Obviously the operation of this structure is the same as that already described.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. The combination with a movable member having a tapered socket, of a wrist pin extending into the socket, and a tapered split bushing having weakening slots both on the inside and outside of the bushing.

2. The combination with a movable member having a tapered socket, of a wrist pin extending into the socket, a tapered split bushing having weakening slots both on the inside and outside of the bushing, and a spring bearing against the larger end of the bushing to urge it into the socket.

3. The combination with two members to be connected, of a wrist pin having bearings in both members, and means engaging both members and the wrist pin for automatically taking up the wear of said bearings.

4. The combination with two members to be connected having sockets, of a wrist pin connecting the members and engaged in the sockets, tapered bushings around the wrist pin and engaged in the sockets, and means for automatically urging the bushings apart.

5. The combination with two members to be connected having alined oppositely tapered sockets, of a wrist pin connecting the members and engaged in the sockets, tapered compressible bushings around the wrist pin and engaged in the sockets, and a spring interposed between the larger ends of the bushings and urging them apart.

6. The combination with two members to be connected having alined oppositely tapered sockets, of a wrist pin connecting the members and engaged in the sockets, tapered compressible bushing around the wrist pin and engaged in the sockets, bearing cups on the larger ends of the bushings, and a coiled spring interposed between and engaged with said cups.

7. The combination with a piston having spaced bearing elements provided with tapered sockets, of a connecting rod having a transverse opening with inwardly tapered end portions, a wrist pin extending through the opening and into the sockets of the piston, compressible tapered bushings in the sockets and tapered portions of the opening, and springs interposed between the larger ends of the bushings to urge them into the sockets.

In testimony whereof I affix my signature.

ALFRED BERGERON.